United States Patent
Kumar et al.

(10) Patent No.: US 10,178,067 B1
(45) Date of Patent: Jan. 8, 2019

(54) DATA CENTER PORTAL APPLICATIONS MONITORING

(71) Applicant: Equinix, Inc., Redwood City, CA (US)

(72) Inventors: Parveen Kumar, Fremont, CA (US); Sriharsha Mukundappa Sathyavathi, Sunnydale, CA (US); Jaganathan Jeyapaul, San Jose, CA (US); Brian J. Lillie, Los Altos, CA (US)

(73) Assignee: Equinix, Inc., Redwood City, CA (US)

( * ) Notice: Subject to any disclaimer, the term of this patent is extended or adjusted under 35 U.S.C. 154(b) by 296 days.

(21) Appl. No.: 15/189,639

(22) Filed: Jun. 22, 2016

Related U.S. Application Data

(60) Provisional application No. 62/339,605, filed on May 20, 2016.

(51) Int. Cl.
*G06F 15/173* (2006.01)
*H04L 29/12* (2006.01)
*H04L 12/26* (2006.01)
*H04L 29/08* (2006.01)

(52) U.S. Cl.
CPC ........ *H04L 61/1535* (2013.01); *H04L 43/106* (2013.01); *H04L 61/1552* (2013.01); *H04L 67/02* (2013.01)

(58) Field of Classification Search
USPC .................................................. 709/223, 226
See application file for complete search history.

(56) References Cited

U.S. PATENT DOCUMENTS

2011/0145399 A1 6/2011 Jeyapaul et al.
2016/0127254 A1 5/2016 Kumar et al.

OTHER PUBLICATIONS

U.S. Appl. No. 15/099,407, by Juxiang Teng, filed Apr. 14, 2016.
U.S. Appl. No. 15/001,766, by Ravindra JN Rao, filed Jan. 20, 2016.

*Primary Examiner* — Hee Soo Kim
(74) *Attorney, Agent, or Firm* — Shumaker & Sieffert, P.A.

(57) ABSTRACT

Techniques are described for monitoring resource consumption, detecting faults, and predicting future faults with internal or customer-facing portal applications that engage data center operations for supporting co-location and, in some cases, interconnection by customers of a co-location provider. For example, an operational intelligence engine for portal applications deployed by a co-location provider stitches together transactions records and logs based on a unique identifier inserted into transactions performed by multiple system applications that execute the portal transactions through a lifecycle of requests and events for the portal and system applications.

18 Claims, 7 Drawing Sheets

DATA CENTER PORTAL APPLICATIONS MONITORING

This application claims the benefit of U.S. Provisional Application No. 62/339,605 filed May 20, 2016, the entire content of which is incorporated by reference.

TECHNICAL FIELD

This disclosure generally relates to data centers, and more specifically, to monitoring data center applications.

BACKGROUND

A co-location facility provider (a "provider") may employ a communication facility, such as a data center or warehouse, in which multiple customers of the provider locate network, server, and storage gear and interconnect to a variety of telecommunications, cloud, and other network service provider(s) with a minimum of cost and complexity. Such co-location facilities may be shared by the multiple customers. By using co-location facilities of the provider, customers of the provider including telecommunications providers, Internet Service Providers (ISPs), application service providers, service providers, content providers, and other providers, as well as enterprises, enjoy less latency and the freedom to focus on their core business.

Customers co-located at a co-location facility typically lease space or storage capacity for a set duration. A co-location facility provider's goal may be to reduce vacancy rates in the co-location facility to zero, while maintaining a high level of service. A provider may want to prevent its customers from leaving the co-location facility and encourage other customers to join the co-location facility.

Cloud computing refers to the use of dynamically scalable computing resources accessible via a network, such as the Internet. The computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS), Platform-as-a-Service (PaaS), and Infrastructure-as-a-Service (IaaS), respectively.

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers. A co-location data center acts as an intermediary between cloud service providers and customers. A co-location data center manages and simplifies multiple contractual relationships between suppliers and consumers, and customizes certain aspects of the cloud service being delivered to map more closely to the requirements of each particular user. Because a co-location data center acts as an intermediary between multiple customer networks and cloud service providers, the co-location data center typically must manage extremely complex networking configurations between a variety of in-house and third party systems, wherein the configurations between these systems may change dynamically as customers begin or end sessions, switch from one cloud service provider to another, or as cloud service providers upgrade their systems. Because of the complex interplay between these systems, it may take a significant amount of time to monitor resource consumption within the co-location data center, detect software and hardware faults, and determine the point of origin of such software and hardware faults so that they may be fixed.

SUMMARY

In general, techniques are described for monitoring resource consumption, detecting faults, and predicting future faults with internal or customer-facing portal applications that engage data center operations for supporting co-location and, in some cases, interconnection by customers of a co-location provider. For example, an operational intelligence engine for portal applications deployed by a co-location provider is described. The operational intelligence engine stitches together transactions records and logs based on a unique identifier inserted into transactions performed by multiple system applications that execute the portal transactions through a lifecycle of requests and events for the portal and system applications. As described herein, a visual interface may visualize the health of the portal applications as well as the status of transactions in-flight. As used herein, the terms "unique identifier," "session identifier," "CDN request identifier," and "identification tag" may be used interchangeably.

In some examples, a user (e.g., customer or data center operator) begins a user session with an internal or customer-facing portal for system applications that support data center operations. As each user session makes service requests to various applications within a portal application system stack, each of the various applications generate application and event logs associated with sub-transactions performed by each of the various applications. An application platform monitor aggregates and stores the application logs within a data platform, where they may be accessed from a single dashboard. The application platform monitor monitors resources consumed by each user session and, using the unique identifier inserted into transactions corresponding to the service requests, analyzes this data to determine points of failure and predict future points of failure within the data center portal applications.

In one example, this disclosure describes a method including: receiving, by a content delivery network (CDN) application that delivers a portal application for a co-location data center, a request from a user of the portal application to conduct a transaction via a plurality of services of a data center platform for the co-location data center managed by a data center provider; generating, by the CDN application, an identification tag associated with the request; and forwarding, by the CDN application, the request and the identification tag to the data center platform to enable the plurality of services to associate respective sub-transactions for the transaction with the identification tag.

In another example, this disclosure describes a method including: receiving, by an application platform monitor for a portal application for a co-location data center and from the portal application, an indication of a request for a user to conduct a transaction via a plurality of services that support the portal application and an identification tag associated with the request; associating, by respective sessionizers of the application platform monitor for the plurality of services, the identification tag with each of a plurality of log file records generated as a result of executing respective sub-transactions by the plurality of services for the transaction;

aggregating, by the application platform monitor, the plurality of log file records into a description of the health of the portal application, wherein each log file record of the plurality of log file records corresponds to one or more events occurring to each service of the plurality of services while processing the transaction; and outputting, by the application platform monitor for display to the customer, the description of the health of the portal application.

In another example, this disclosure describes a computing device including: one or more programmable processors operably coupled to at least one memory; an application platform monitor for a portal application for a co-location data center, the application platform monitor configured for execution by the one or more programmable processors to receive, from the portal application, an indication of a request for a user to conduct a transaction via a plurality of services that support the portal application and an identification tag associated with the request, wherein the application platform monitor is further configured to associate, by respective sessionizers of the application platform monitor for the plurality of services, the identification tag with a plurality of log files generated as a result of executing respective sub-transactions by the plurality of services for the transaction, wherein the application platform monitor is further configured to aggregate the plurality of log files into a description of the health of the portal application, wherein each log file of the plurality of log files corresponds to one or more events occurring to each service of the plurality of services while processing the transaction, and wherein the application platform monitor is further configured to output, for display to the customer, the description of the health of the portal application.

In another example, this disclosure describes a non-transitory computer-readable medium including instructions to cause at least one processor of a computing device to: receive, by an application platform monitor from a portal application for a co-location data center, an indication of a request for a user to conduct a transaction via a plurality of services that support the portal application and an identification tag associated with the request; associate, via respective sessionizers of the application platform monitor for the plurality of services, the identification tag with each of a plurality of log file records generated as a result of executing respective sub-transactions by the plurality of services for the transaction; aggregate the plurality of log file records into a description of the health of the portal application, wherein each log file record of the plurality of log file records corresponds to one or more events occurring to each service of the plurality of services while processing the transaction; and output, for display to the customer, the description of the health of the portal application.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the figures and text.

DETAILED DESCRIPTION

Figure 1:
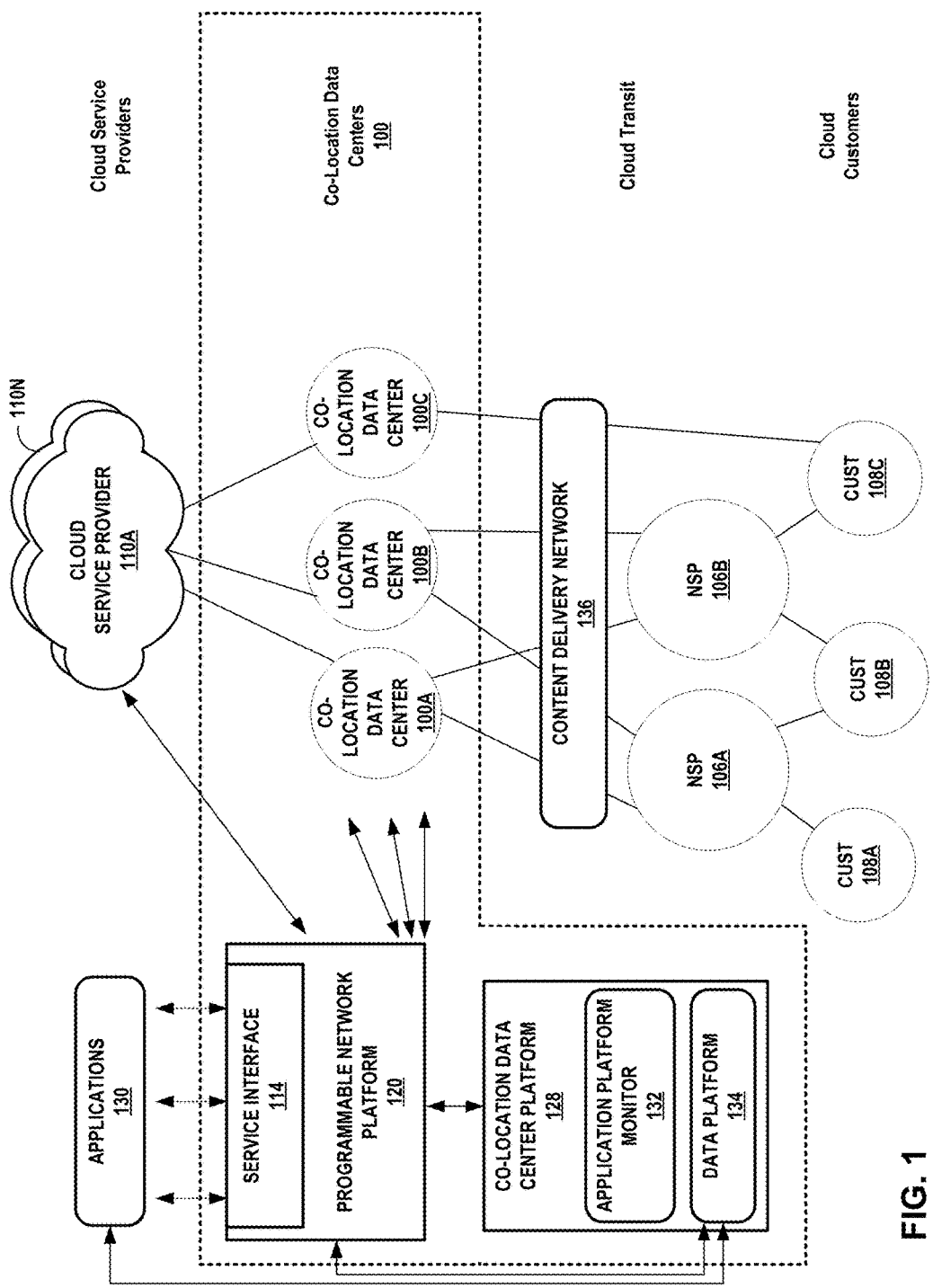
FIG. 1 is a block diagram that illustrates a high-level view of a data center that provides resource monitoring, fault detection, and fault prediction for a co-location services exchange according to the techniques of the disclosure.

FIG. 1 is a block diagram illustrating an example co-location data center 100 that includes a co-location data center platform 128 for monitoring resource consumption, detecting faults, and predicting future faults of a portal for engaging a co-location data center platform 100. In general, a user such as customer 108A or a provider operator begins a user session with the portal application for engaging a co-location data center 100. As the user session makes service requests to various applications 130 within co-location data center 100, each of the applications 130 perform various sub-transactions to service the requests. Application monitor 132 monitors application and event log files generated by the sub-transactions executed during the user session. Application platform monitor 132 aggregates and stores logs within data platform 134, and analyzes this event data to determine points of failure and predict future points of failure within portal applications for co-location data center 100.

As illustrated by FIG. 1, co-location centers 100A-100C ("co-location centers 100") may provide an access point by which cloud-based services customers ("cloud customers") and cloud-based service providers ("cloud providers") connect to receive and provide, respectively, cloud services. A co-location data center provider may deploy instances of co-location data centers 100 in multiple different metropolitan areas, each instance of co-location data center 100 having one or more co-location data center points (not depicted). A co-location center may offer interconnection services, such as a cloud exchange, an Ethernet exchange, an Internet exchange, or cross-connections.

Co-location centers 100 may include a cloud exchange and thus include network infrastructure and an operating environment by which cloud customers 108A-108C (collectively, "cloud customers 108") receive cloud services from multiple cloud service providers 110A-110N (collectively, "cloud service providers 110"). Cloud customers 108 may receive cloud-based services directly via a layer 3 peering and physical connection to co-location centers 100 or indirectly via one of network service providers 106A-106B (collectively, "NSPs 106," or alternatively, "carriers 106"). NSPs 106 provide "cloud transit" by maintaining a physical presence within co-location data centers 100 and aggregating layer 3 access from one or customers 108. NSPs 106 may peer, at layer 3, directly with co-location centers 100, and in so doing, offer indirect layer 3 connectivity and peering to one or more customers 108 by which customers 108 may obtain cloud services from the cloud service providers 110. Co-location centers 100, in the example of FIG. 1, are assigned an autonomous system number (ASN). Thus, co-location exchange points 129 are next hops in a path vector routing protocol (e.g., BGP) path from cloud service providers 110 to customers 108. As a result, any of co-location centers 100 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, co-location centers 100 may internalize the eBGP peering relationships that cloud service providers 110 and customers 108 would maintain on a pairwise basis. Rather, co-location data center 100 allows a customer 108 to configure a single eBGP peering relationship with co-location centers 100 and receive, via the co-location data center, multiple cloud services from one or more cloud service providers 110. While described herein primarily with respect to eBGP or other layer 3 routing protocol peering between co-location centers 100 and customer, NSP, or cloud service provider networks, co-location centers 100 may learn routes from these networks in other way, such as by static configuration, or via Routing Information Protocol (RIP), Open Shortest Path First (OSPF), Intermediate System-to-Intermediate System (IS-IS), or other route distribution protocol.

Content delivery network ("CDN") 136 is a globally distributed network of proxy servers deployed in multiple data centers. CDN 136 acts as a point of entry for customers 108 to access co-location data center 100. CDN 136 serves content to end-users with high availability and high performance. Co-location data center 100 may enlist a CDN operator to deliver the content of co-location data center 100 to their audience of end-users. Besides better performance and availability, CDN 136 also offloads the traffic served directly from the origin infrastructure of co-location data center 100, resulting in possible cost savings for the content provider. In addition, CDN 136 provides the content provider a degree of protection from DoS attacks by using their large distributed server infrastructure to absorb the attack traffic. In some examples, customers 108 access co-location data center 100 via a browser-based web portal that CDN 136 provides to customers 108. In some examples, one or more applications 130 represent at least one portal application delivered, at least in part, by CDN 136 to users.

As examples of the above, customer 108C is illustrated as having contracted with the provider for co-location data center 100 to directly access layer 3 cloud services through CDN 136 via co-location centers 100 and also to have contracted with NSP 106B to access layer 3 cloud services via a transit network of the NSP 106B. Customer 108B is illustrated as having contracted with multiple NSPs 106A, 106B to have redundant cloud access to CDN 136, and thus co-location centers 100, via respective transit networks of the NSPs 106A, 106B. The contracts described above are instantiated in network infrastructure of co-location centers 100 by L3 peering configurations within switching devices of NSPs 106 and co-location centers 100 and L3 connections, e.g., layer 3 virtual circuits, established within co-location centers 100 to interconnect cloud service provider 110 networks to NSPs 106 networks and customer 108 networks, all having at least one port offering connectivity within co-location centers 100.

In some examples, co-location data center 100 allows a corresponding one of customer customers 108A, 108B of any network service providers (NSPs) or "carriers" 106A-106B (collectively, "carriers 106") or other cloud customers including customers 108C to be directly cross-connected, via a virtual layer 2 (L2) or layer 3 (L3) connection to any other customer network and/or to any of CSPs 110, thereby allowing direct exchange of network traffic among the customer networks and CSPs 110.

Carriers 106 may each represent a network service provider that is associated with a transit network by which network subscribers of the carrier 106 may access cloud services offered by CSPs 110 via the co-location data center 100. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the co-location data center 100.

In this way, co-location data center 100 streamlines and simplifies the process of partnering CSPs 110 and customers (via carriers 106 or directly) in a transparent and neutral manner. One example application of co-location data center 100 is a co-location and interconnection data center in which CSPs 110 and carriers 106 and/or customers 108 may already have network presence, such as by having one or more accessible ports available for interconnection within the data center, which may represent co-location centers 100. This allows the participating carriers, customers, and CSPs to have a wide range of interconnectivity options within the same facility. A carrier/customer may in this way have options to create many-to-many interconnections with only a one-time hook up to co-location centers 100. In other words, instead of having to establish separate connections across transit networks to access different cloud service providers or different cloud services of one or more cloud service providers, co-location data center 100 allows customers to interconnect to multiple CSPs and cloud services.

Co-location data center 100 includes a programmable network platform 120 for dynamically programming a services exchange (e.g. a cloud exchange) of the co-location data center 100 to responsively and assuredly fulfill service requests that encapsulate business requirements for services provided by co-location data center 100 and/or cloud service providers 110 coupled to the co-location data center 100. The programmable network platform 120 as described herein may, as a result, orchestrate a business-level service across heterogeneous cloud service providers 110 according to well-defined service policies, quality of service policies, service level agreements, and costs, and further according to a service topology for the business-level service.

The programmable network platform 120 enables the cloud service provider that administers the co-location data center 100 to dynamically configure and manage the co-location data center 100 to, for instance, facilitate virtual connections for cloud-based services delivery from multiple cloud service providers 110 to one or more cloud customers 108. The co-location data center 100 may enable cloud customers 108 to bypass the public Internet to directly connect to cloud services providers 110 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

Programmable network platform 120 may represent an application executing within one or more data centers of the co-location data center 100 or alternatively, off-site at a back office or branch of the cloud provider (for instance). Programmable network platform 120 may be distributed in whole or in part among the co-location centers 100.

In the illustrated example, programmable network platform 120 includes a service interface (or "service API") 114 that defines the methods, fields, and/or other software primitives by which applications may invoke the programmable network platform 120. The service interface 114 may allow carriers 106, customers 108, cloud service providers 110, and/or the co-location data center provider programmable access to capabilities and assets of the co-location data center 100.

For example, the service interface 114 may facilitate machine-to-machine communication to enable dynamic provisioning of virtual circuits in the co-location data center for interconnecting customer and cloud service provider networks. In this way, the programmable network platform 120 enables the automation of aspects of cloud services provisioning. For example, the service interface 114 may provide an automated and seamless way for customers to establish, de-install and manage interconnection with multiple, different cloud providers participating in the co-location data center.

Further example details of a services exchange, such as a cloud-based services exchange, can be found in U.S. Provisional Patent Application No. 62/149,374, filed Apr. 17, 2015 and entitled "Cloud-Based Services Exchange;" in U.S. Provisional Patent Application No. 62/072,976, filed Oct. 30, 2014 and entitled "INTERCONNECTION PLATFORM FOR REAL-TIME CONFIGURATION AND MANAGEMENT OF A CLOUD-BASED SERVICES EXCHANGE;" and in U.S. patent application Ser. No. 15/001,766 and entitled "MULTI-CLOUD, MULTI-SERVICE DATA MODEL," each of which are incorporated herein by reference in their respective entireties.

Applications 130 represent systems of engagement by which customers or internal operators for the co-locations data centers 100 may request services, request assets, request information regarding existing services or assets, and so forth. Each of applications 130 may represent a web portal, a console, a stand-alone application, an operator portal, a customer portal, or other application by which a user may engage programmable network platform 120.

In accordance with techniques described in this disclosure, co-location data center platform 128 monitors resource consumption, detect faults, and predict future faults within applications that support co-location data center 100 in real time, and provides this consolidated information to a customer. Data platform 134 of co-location data center platform 128 receives and aggregates information associated with specific processes, resources, software, and hardware of co-location data center 100. Application platform monitor 132 performs analysis on this information and operates to inform a customer as to specific processes, resources, software, and hardware of co-location data center 100 that require attention or maintenance. Accordingly, co-location data center platform 128 may greatly reduce the amount of time required to determine the point of origin of faults within co-location data center 100, as well as allow administrators to perform preventative maintenance to avoid potential failures of co-location data center 100.

According to the techniques of the disclosure, a customer may begin at least one user session with an application 130 for engaging the co-location data center 100. As each user session makes service requests to the application 130, application platform monitor 132 aggregates and stores application notifications, events, and logs generated by sub-transactions of applications 130 and pertaining to a specific user session within data platform 134. In some cases, CDN 136 delivering the applications 130 inserts into each sub-transaction, generated by applications 130, a session identifier associated with the user session with applications 130 and, more specifically in some cases, with the service request transaction. CDN 136 may store CDN log files for the service request transaction in association with the session identifier for the user session. In addition, applications 130 may generate application logs that store records for the service request transaction in association with the session identifier for the user session. In addition, proxy servers (not shown) for delivering applications 130 may generate proxy log files that store records for the service request transaction in association with the session identifier for the user session. Each of CDN 136, applications 130, and the proxy servers receive the session identifier from CDN 136, which generates the session identifier as a CDN request identifier that identifies a service request to the CDN 136. Applications 130, the proxy servers, and the CDN 136 may store corresponding log files each having one or more records for the service request transaction to data platform 134. As used herein, the terms "unique identifier," "session identifier," "CDN request identifier," and "identification tag" may be used interchangeably.

Application platform monitor 132 monitors resources consumed by each user session and analyzes this data to determine points of failure within co-location data center 100. For example, application platform monitor 132 may determine software and hardware faults, resource bottlenecks, unresponsive threads, etc. Further, based on this analysis and observation of previous failures, application platform monitor 132 may detect conditions indicating future points of failure within the co-location data center. Application platform monitor 132 may query data platform 134 to obtain records stored to the application log files, CDN log files, and proxy server log files that are identifiable using a session identifier. In other words, based on a session identifier, application platform monitor 132 may obtain records from log files generated by multiple different data sources (in this example, applications 130, CDN 136, and proxy servers for application delivery), the records each associated with a particular user session with applications 130. By analyzing the records, application platform monitor 132 may generate user-level and system-level behavior analytics information for customer portals and internal ports to applications for engaging with the co-location data centers.

The architecture of co-location data center 100 illustrated in FIG. 1 is shown for exemplary purposes only. The techniques as set forth in this disclosure may be implemented in the example co-location data center 100 of FIG. 1, as well as other types of co-location data centers or data centers not described specifically herein. Nothing in this disclosure should be construed so as to limit the techniques of this disclosure to the example architecture illustrated by FIG. 1.

Figure 2:
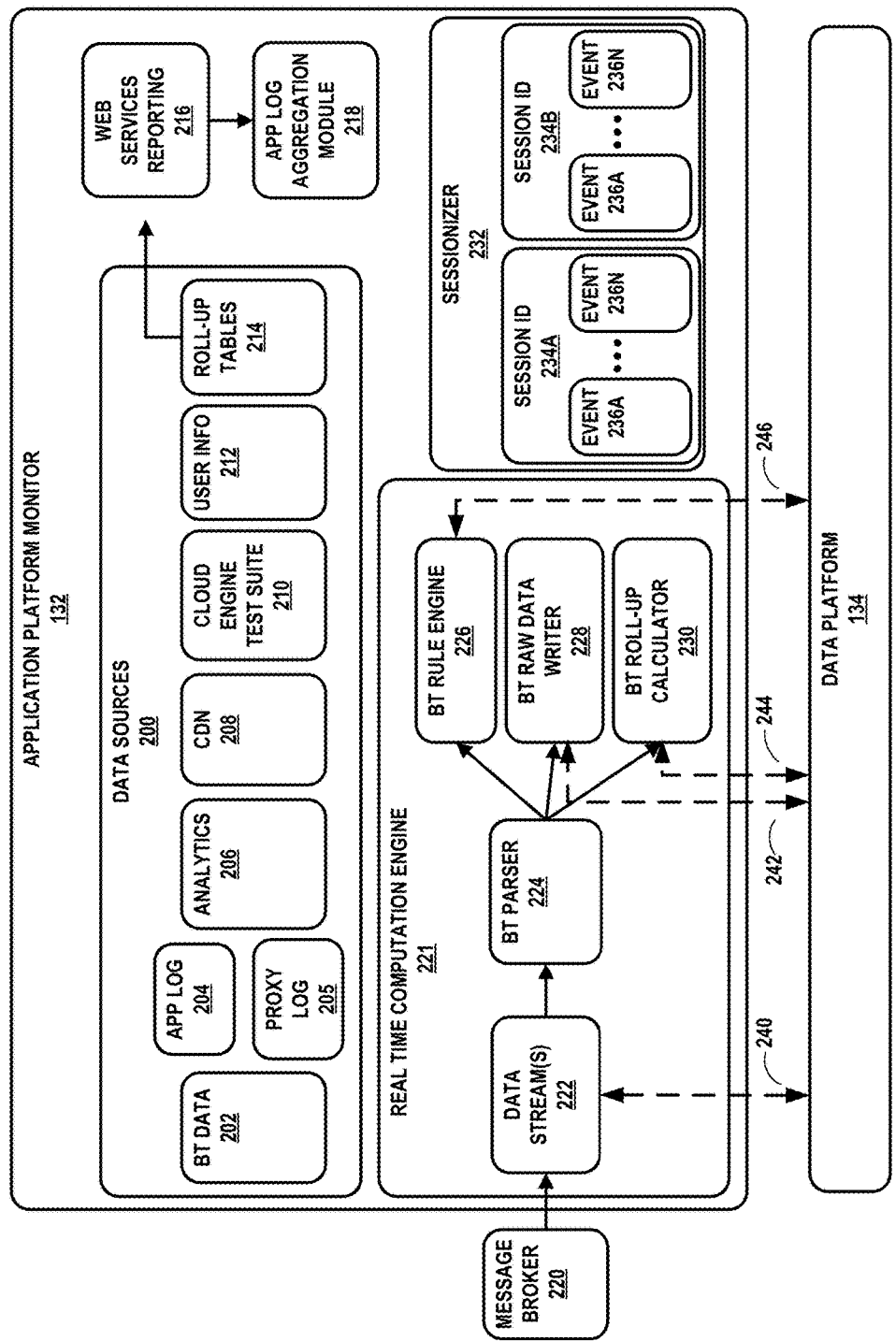
FIG. 2 is a block diagram that illustrates an application platform monitor that provides resource monitoring, fault detection, and fault prediction for a co-location services exchange according to the techniques of the disclosure.

FIG. 2 is a block diagram that illustrates an application platform monitor 132 of FIG. 1 in further detail in which application platform monitor 132 provides resource monitoring, fault detection, and fault prediction in a portal application for co-location data center 100 according to the techniques of the disclosure. In the example of FIG. 2, a user session with a portal application makes a series of requests to applications 130 of co-location data center 100. Sessionizer 232 attaches a unique session identifier 234 to each request, such that each of applications 130 receives the session identifier. Each session identifier 234 includes one or more events 236A-236N associated with the session identifier 234. Services executed by applications 130 create data sources 200, which include logs, events, and notifications from applications 130. This data is input to real time computation engine 221 as data streams 222. Real time computation engine 221 includes one or more stream processing modules, such as behavioral tracking (BT) parser 224, BT rule engine 226, BT raw data writer 228, and BT Roll-up Calculator 230, which aggregate data streams from applications 130 into coherent status data associated to each user session and stored within data platform 134 along outbound links 240, 242, 244, and 246. This data may subsequently be analyzed to determine the status of a portal application for co-location data center 100, detect faults in a portal application for co-location data center 100, and predict potential faults in a portal application for co-location data center 100.

Data sources 200 includes data from numerous applications 130, such as behavioral tracking ("BT") data 202, application log 204, proxy log 205, customer analytics module 206, CDN log 208, cloud engine test suite 210, user information 212, and roll-up tables 214

Behavioral tracking data 202 is created by a specific set of instrumented applications for co-location data center 100. Application platform monitor 132 may use this data to perform system and user analytics. In some examples, the behavior tracking data is received as Java Message Service (JMS) Messages. Once the message has been read as a data stream 222, it is available for processing by the real time computation engine. The BT data undergoes various forms of processing. For example, BT parser 224 parses the BT data, BT rule engine 226 applies analysis rules to the data, and, BT roll-up calculator 230 performs roll up calculations. The raw, roll up, and sessionized data is stored in the data platform 134 along outbound links 240, 242, 244, and 246.

Applications 130 of co-location data center 100 generate application log files 204 while performing sub-transactions to service the user request. Application platform monitor 132 ingests and stores these logs within data platform 134 in real time. Application platform monitor 132 also provides a mechanism to retrieve and display the log files. Further, Application platform monitor 132 performs analysis and queries on the log files to perform resource monitoring, fault detection, and fault prediction.

Application platform monitor 132 uses proxy logs 205 to troubleshoot errors which occur in the various applications 130 supporting co-location data center 100. In some examples, a flume agent is installed on the proxy log servers. The flume agents are used to append proxy logs 205 to message broker 220. The message broker 220 provides these messages to the real time computation engine 221 for further processing. The raw data is ingested and stored in the data platform 134. Additionally, the logs are correlated with other data sources using a CDN session identifier. In the example of FIG. 2, sessionizer 232 injects a session identifier directly into each proxy log.

Analytics data 206 includes data such as website traffic tracking and reports. In some examples, analytics data 206 includes tracking landing page quality, conversions, advertisement data, sales, lead generation, specific page views, or file downloads. In some examples, analytics data 206 may identify where visitors came from (referring pages), how long the visitors stayed on a particular page, or their geographical position. In some examples, analytics data 206 includes sales tracking and performance, such as a site's transactions, revenue, or other commerce-related metrics. In some examples, analytics data 206 provides data to help understand the behavior of component groups of users apart from a total user population. In some examples, analytics data 206 may be generated by a third party, such as Google Analytics.

Content delivery network ("CDN") data 208 is provided by a third party CDN. A content delivery network is a globally distributed network of proxy servers deployed in multiple data centers. The CDN serves content for a portal application for engaging co-location data center 100 services and applications to end-users with high availability and high performance. Co-location data center 100 may use a CDN operator to deliver the portal application content to end-users. Besides better performance and availability, CDNs may also offload the traffic served directly from the origin infrastructure for the data centers 100 provider, resulting in possible cost savings for the content provider. In addition, CDNs provide the content provider a degree of protection from DoS attacks by using their large distributed server infrastructure to absorb the attack traffic. In some examples, CDN data 208 is provided by a third party.

Cloud engine test suite data 210 includes information used to optimize the performance and availability of web, mobile, streaming and cloud applications. The cloud engine test suite integrates real-user and synthetic monitoring and provides insight into the end-user experience. This information includes measurements of performance across all users, locations, browsers, devices and transactions; information sufficient to identify scalability and performance problems within applications 130 and information sufficient to isolate, prioritize, diagnose and resolve performance problems. In some examples, this information describes measurements of application performance as experienced by real users. Generally, this information may include raw browser page data provided by a third party. In some examples, the cloud engine test suite is Gomez User Experience Management ("UEM").

User information 212 may include information sufficient to identify the customer associated with a particular session identifier. In some examples, this information includes the name, address, or business of the customer. It other examples, this information includes an account number for the customer or an identification of associated applications, webservices, and cloud service providers available to the customer.

Roll up tables 214 store and aggregate information related to the plurality of users accessing customer-facing portal applications and contextualize the information for display to administrators via the dashboard. In some examples, this information includes user behavioral and statistical data, such as the number of customer logins per hour, day, or month. In some examples, this information includes information describing events per customer, such as the number of errors or exceptions per customer over a particular amount of time. In some examples, this information includes the frequency of monitoring performed by application platform monitor 132. For example, different applications of applications 130 may generate log files hourly, daily, or weekly. In some examples, this information includes metadata describing hierarchical details of each customer. For example, this metadata may include information describing the customer, such as the organization name, each child account associated with the customer, and license or security permissions for the customer. Further, the metadata may include geographic information, such the continent, country, city/metro area, and data center the customer accesses. In some examples, roll-up tables 214 allow aggregation of user data such that it may be displayed via the dashboard at different hierarchical levels.

Roll up tables 214 store this information and assist real time processing engine 221 in accurately consolidating the log files generated by applications 130 having different time periods for gathering and reporting status information.

The report web services module 216 creates reports aggregating information provided by data sources 200. In some examples, these reports include user page views, page views, login information, user page responses, report downloads, transactions, and failed logins. In some examples, this information is generated hourly, daily, or weekly. Application log aggregation module 218 receives these reports, in addition to information from data platform 134. Application log aggregation module 218 uses this information to dynamically generate a web page to display the aggregated data to an administrator in real time. An example interface generated by report web services module 216 and application log aggregation module 218 is described below with respect to FIG. 6.

Message broker 220 is an intermediary program module that translates a message from the formal messaging protocol of applications 130 and data sources 200 to the formal messaging protocol of real time computation engine 221. Message broker 220 acts as an architectural pattern for message validation, transformation and routing. Message broker 220 mediates communication amongst applications 130 and real time computation engine 221, minimizing the mutual awareness that applications should have of each other in order to be able to exchange messages, effectively implementing decoupling. The purpose of message broker 220 is to take incoming messages from applications 130 and perform some action on them. In some examples, message broker 220 routes messages to real time computation engine 221. In some examples, message broker transforms messages to an alternative representation. In some examples, message broker 220 performs message aggregation by decomposing messages into multiple messages and sending them to real time computation engine 221 and recomposing responses into one message to return to the application. In some examples, message broker 220 interacts with an external repository to augment a message or store it. In some examples, message broker 220 invoke Web services to retrieve data. In some examples, message broker 220 respond to events or errors reported by applications 130 attempting to communicate with real time computation engine 221. In some examples, message broker 220 provides content and topic-based message routing using a publish-subscribe pattern. In some examples, message broker 220 may be ActiveMQ or RabbitMQ.

Real time computation engine 221 is a distributed computation framework that allows batch, distributed processing of streaming data. Real time computation engine 221 is designed as a "topology" in the shape of a directed acyclic graph (DAG) with data streams and processing modules acting as the graph vertices. Edges on the graph are named data streams and direct data from one node to another. Together, the topology acts as a data transformation pipeline. In some examples, the architecture of real time computation engine 221 is Apache Storm, and the data streams and processing modules of real time computation engine 221 are Apache Spouts and Bolts, respectively.

Data streams 222 are the core abstraction in real time computation engine 221. Data streams 222 are unbounded sequences of tuples that are processed and created in parallel in a distributed fashion. Data streams 222 are defined with a schema that names the fields in the data stream's tuples. By default, tuples can contain integers, longs, shorts, bytes, strings, doubles, floats, booleans, and byte arrays. In some examples, data streams 222 define serializers so that custom types can be used natively within tuples. In some examples, data streams 222 are streams of application log, event, and notification data from data sources 200.

The logic for real time computation engine 221 is packaged into processing modules, such as BT parser 224, BT rule engine 226, and BT raw data writer 228. Processing modules perform filtering, functions, aggregations, joins, talking to databases, etc. Further, processing modules perform simple stream transformations. Complex stream transformations often require multiple steps and thus multiple processing modules. Further, in some examples, processing modules emit more than one stream. Processing modules BT parser 224, BT rule engine 226, and BT raw data writer 228 perform various operations on data streams 222 to stitch the data from multiple sources into one common format that is stored on data platform 134 via outgoing links 240, 242, 244, 246. Application monitor 132 may analyze the data stored within data platform 134 to provide real-time resource monitoring of applications 130, as well as software and hardware fault detection and prediction of a portal application for co-location data center 100.

Sessionizer 232 stitches together log files from multiple data sources 200 across applications 130. In one example, sessionizer 232 associates a unique session identifier to each user session generating application logs 204, proxy logs 205, CDN logs 208, and BT data 202. In some examples, CDN 136 generates the unique session identifier as part of servicing a request from a user, e.g., customer 108. Sessionizer 232 may modify each of application logs 204 and proxy logs 205 to incorporate the unique session identifier from CDN 136. In some examples, sessionizer 232 uses real-time computation engine 221 to parse and format the field for each record that is stitched together and stored as columns. The unique session identifier may subsequently be used as a key to access the column of the associated record. Thus, each notification or event within the corresponding log file of each of applications 130 corresponds to a particular user session instance of a particular user, e.g., customer 108. Accordingly, this information can be analyzed to determine the specific customer and service that encountered a fault when attempting to analyze the a portal application for co-location data center 100 for errors.

According to the techniques of the disclosure, customers 108 begin at least one user session with a portal application for co-location data center 100 through a CDN access point. In some examples, a CDN applies a CDN identifier to each user session as the user accesses a portal application for co-location data center 100. In this example, the unique session identifier is a complete UNIX timestamp or other computing system-generated timestamp of the date and time the user submitted a request for services to co-location data center 108. The CDN modifies the service request to include the service identifier, and provides the modified service request to co-location data center 108. Sessionizer 232 receives this request, determines the corresponding session identifier, and attaches the session identifier to requests forwarded to applications 130.

As the various applications 130 generate data sources 202, including information such as notifications and log files, this information is fed into real time computation engine 221 as data streams 222 into processing modules BT parser 224, BT rule engine 226, and BT raw data writer 228. Processing modules BT parser 224, BT rule engine 226, and BT raw data writer 228 processes data from data streams 222 and stores the data within data platform 134.

Web services reporting 216 compiles the information stored within data platform 134 into reports associated with a particular customer or session identifier. App log aggregation module 218 receives these compiled reports and create a web page so that a customer may view the status of the portal application of the co-location data center in real time. In some examples, app log aggregation module 218 uses the compiled reports to provide information regarding faults within the portal application of the co-location data center. In further examples, app log aggregation module 218 compares information regarding previous faults with the current status and predicts a fault that has not yet occurred based on the correlation of current conditions to historical conditions occurring prior to a fault in the portal application of the co-location data center.

The architecture of application platform monitor 132 illustrated in FIG. 2 is shown for exemplary purposes only. The techniques as set forth in this disclosure may be implemented in the example application platform monitor 132 of FIG. 2, as well as other types of application platform monitors not described specifically herein. Nothing in this disclosure should be construed so as to limit the techniques of this disclosure to the example architecture illustrated by FIG. 2.

Figure 3:
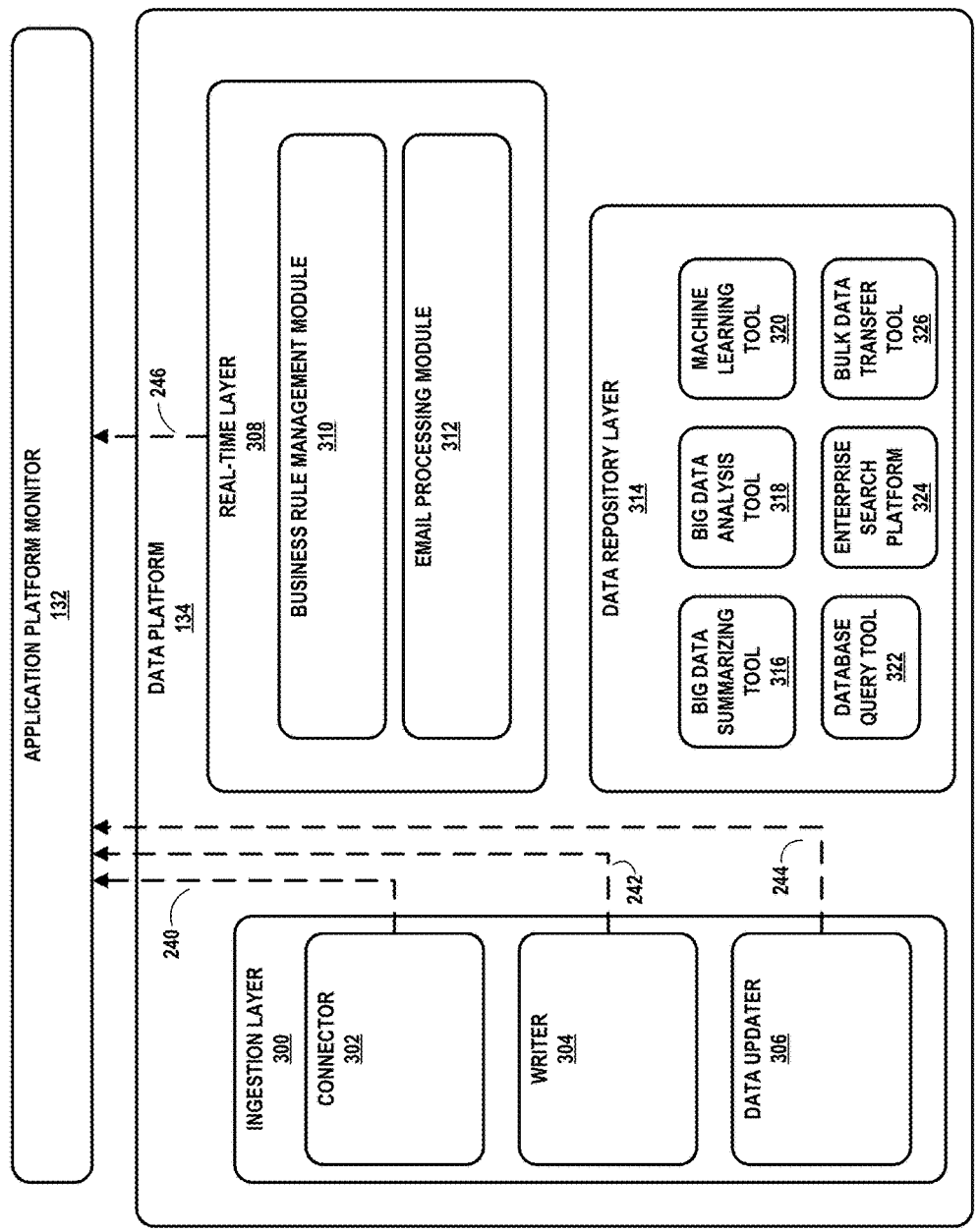
FIG. 3 is a block diagram that illustrates a data platform that provides data warehousing services for application event logging within a co-location services exchange according to the techniques of the disclosure.

FIG. 3 is a block diagram that illustrates a data platform 134 that provides data warehousing services for application event logging within a co-location services exchange according to the techniques of the disclosure. Data platform 134 includes an ingestion layer 300, which receives information describing logs, events, and notifications associated with a unique session identifier and generated by applications 130 from application platform monitor 132 and stores it within a database 402 of FIG. 4. Data platform 134 further includes a real-time layer 308 for performing real-time database processing of data streams output by BT rule engine 226 along link 246. Data platform 134 further includes data repository layer 314, which provides various applications for management of data stored within database 402 of FIG. 4.

Ingestion layer 300 provides intake functions for log data generated by applications 130. For example, connector 302 provides a conduit to connect database 402 of FIG. 4 to the source data repository (e.g., the repository storing the application log information) via data streams 240, 242, 244 and ingest it for processing by data platform 134. Because of the large volume of data, connector 302 provides infrastructure to route the content from the source repository to processing, such as from text extraction on binary formats, language detection, entity extraction, and sentiment analysis. Connector 302 further provides scalable, scaling of workflows and support for multiple executing multiple graphs. Writer 304 acts to copy ingested data into database 402 of FIG. 4. Further, data updater 306 acts to update references within database 402 in an efficient manner.

Real-time layer 308 performs real-time database processing of data streams output by BT rule engine 226 along link 246. Business rule management module 310 is a business rule management system (BRMS) with a forward and backward chaining inference based rules engine, (e.g., a production rule system) that uses an enhanced implementation of the Rete algorithm. Business rule management module 310 applies logic, also referred to as business rules, that includes policies, requirements, and conditional statements used to determine tactical actions that take place in applications and systems. In some examples, business rule management module 310 represents Drools. Business rule management module 310 applies rule management to application log information, such as behavior tracking information, in real time. Real-time layer 308 may further include email processing module 312 for performing real time processing of email information.

Figure 4:
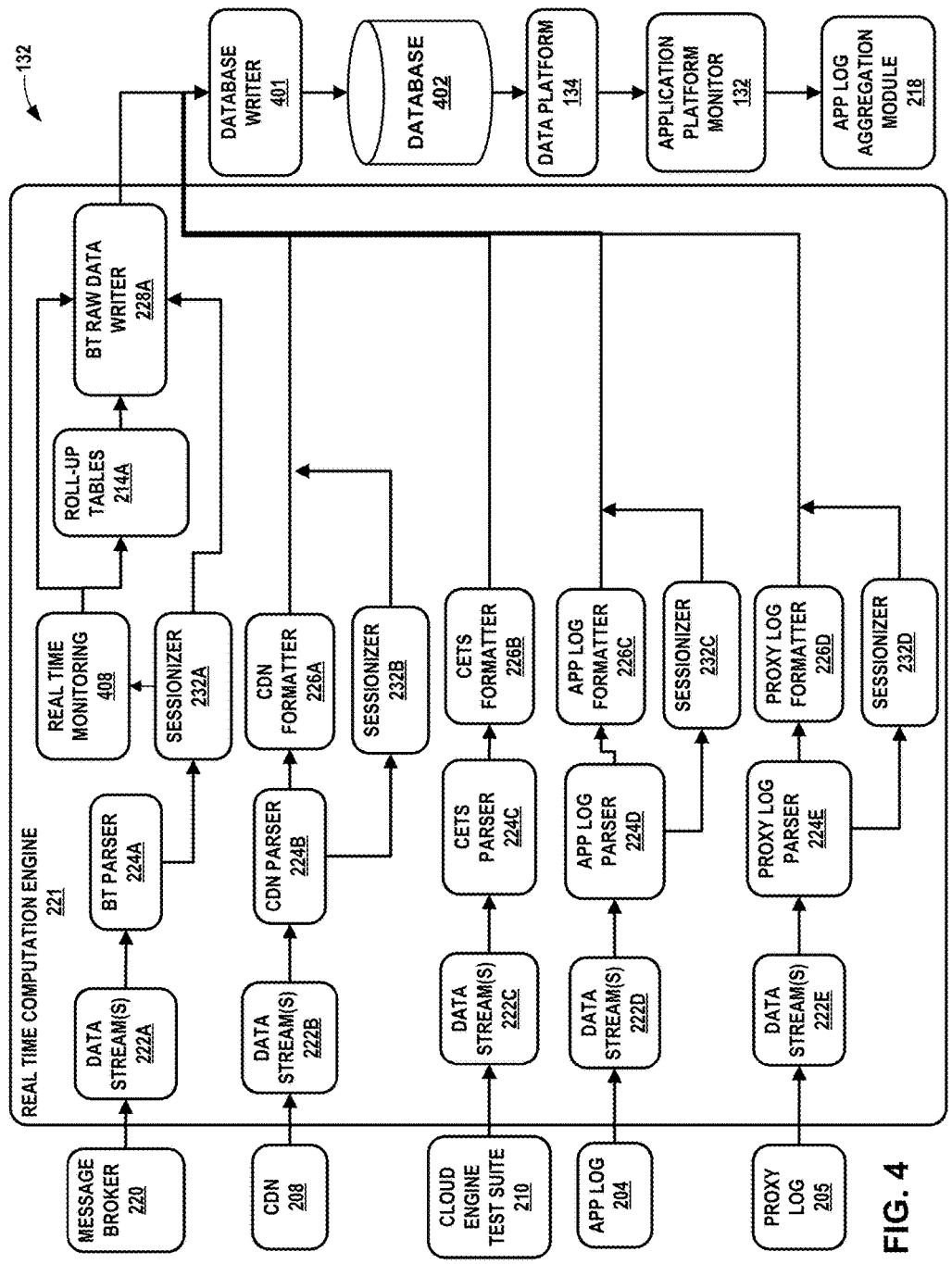
FIG. 4 is a block diagram that illustrates a real time computation engine for analyzing application event logs to monitor resources, detect faults, and predict faults within a co-location services exchange according to the techniques of the disclosure.

Data repository layer 314 provides various applications for management of data stored within database 402 of FIG. 4. For example, data repository layer 314 provides big data summarizing tool 314. Big data summarizing tool 316 is an SQL-like warehouse infrastructure built on top of a distributed storage and distributed processing system. Big data summarizing tool 316 provides data summarization, query, and analysis. Big data summarizing tool 316 allows indexing to provide acceleration. Big data summarizing tool 316 allows different storage types such as plain text, RCFile, HBase, ORC, etc. Big data summarizing tool 316 operates on compressed data stored into the distributed storage system. Big data summarizing tool 316 further provides built-in user defined functions (UDFs) to manipulate dates, strings, and other data-mining tools. In some examples, big data summarizing tool 316 is Apache Hive.

Data repository layer 314 also provides support for big data analysis tool 318. Big data analysis tool 318 is a platform for analyzing large data sets that consists of a high-level language for expressing data analysis programs, coupled with infrastructure for evaluating these programs. Big data analysis tool 318 further provides a scripting language with a focus on data flows. Big data analysis tool 318 is amenable to substantial parallelization, which in turns enables it to handle very large data sets. The infrastructure layer of big data analysis tool 318 includes a compiler that produces sequences of Map-Reduce programs, for which large-scale parallel implementations already exist and may be used. In some examples, big data analysis tool 318 is Apache Pig.

Data repository layer 314 further provides machine learning tool 320. Machine learning tool 320 is a library of scalable machine-learning algorithms. Machine learning tool 320 is focused on implementations of distributed and scalable machine learning algorithms focused primarily in the areas of collaborative filtering, clustering and classification. Machine learning tool 320 permits application platform monitor 132 to build an environment for quickly creating scalable machine learning applications. For example, machine learning tool 320 enables application platform monitor 132 to automatically find meaningful patterns in big data sets. For example, machine learning tool 320 enables application platform monitor 132 to find patterns correlating historical application log information to historical faults in a portal application for co-location data center 100, and use these correlations to predict faults in a portal application for co-location data center 100 before they occur.

Data repository layer 314 further provides a database query tool 322. Database query tool 322 allows a data platform 134 to communicate with database 402 of FIG. 4. For example, data platform 134. For example, data platform 134 uses database query tool 322 to directly make changes to data, look up data, or change the way data is stored. In some examples, database query tool 322 is the Cassandra Query Language ("CQL").

Data repository layer 314 further provides enterprise search platform 324. Enterprise search platform 324 provides full-text search, hit highlighting, faceted search, real-time indexing, dynamic clustering, database integration, NoSQL features, and rich document (e.g., Word, PDF) handling for database 402 of FIG. 4. Enterprise search platform 324 further provides distributed search and index replication and is designed for scalability and fault tolerance. In some examples, enterprise search platform 324 runs as a standalone full-text search server. In some examples, enterprise search platform 324 is Solr.

Data repository layer 314 further provides a bulk data transfer tool 326. Bulk data transfer tool 326 is an application for transferring data between relational databases and distributed storage. Bulk data transfer tool 326 supports incremental loads of a single table or a free form SQL query. Bulk data transfer tool 326 further supports saved jobs which can be run multiple times to import updates made to a database since the last import. In some examples, bulk data transfer tool 326 is SQOOP.

The architecture of data platform 134 illustrated in FIG. 3 is shown for exemplary purposes only. The techniques as set forth in this disclosure may be implemented in the example data platform 134 of FIG. 3, as well as other types of data platforms not described specifically herein. Nothing in this disclosure should be construed so as to limit the techniques of this disclosure to the example architecture illustrated by FIG. 3.

FIG. 4 is a block diagram that illustrates a real time computation engine for analyzing application event logs to monitor resources, detect faults, and predict faults for a portal application for a co-location data center according to the techniques of the disclosure.

Real time computation engine 221 receives information, such as application logs, events, and notifications, from data sources 200, including message broker 220, CDN 208, cloud engine test suite 210, app log 204, and proxy log 205. Real time computation engine 221 converts this information into data streams 222A-222E (collectively, "data streams 222"). Data streams 222 feed streams of data to the corresponding parser processing modules 224A-224E (collectively, "processing modules 224"). With respect to BT Parser 224A, the parsed data stream is fed into sessionizer 232A for sessionizing. The output data stream of sessionizer 232A is fed into real time monitoring module 408 and BT raw data writer 228A. The real time monitoring module 408 outputs a data stream to roll-up tables 214A as well as BT raw data writer 228A. Finally, roll-up tables 214A output a data stream to BT raw data writer 228A. BT raw data writer 228 aggregates this raw information and compiles it into a format usable by database writer 401 to write to database 402. With respect to CDN parser 224B, APP Log parser 224D, and Proxy Log parser 224E, the parsed data stream is fed into a format processing module (e.g., 226A, 226C, and 226D) and a sessionizer (e.g., 232B, 232C, and 232D), while with respect to cloud engine test suite parser 224C, the parsed data stream is fed into cloud engine teste suite formatter 226B only. Formatting modules 226A-226E. The formatter processing modules format the data streams into a format usable by database writer 401 to write to database 402. Sessionizers 232B-232D sessionize the data by adding a session identifier to the data and output the results to database writer 401.

Database writer 401 receives the multiple data streams and writes the information to database 402. As discussed above, data platform 134 may perform various data warehousing functions to access the application log information stored by database 401. Data platform 134 may provide this information to application platform monitor 132, which may perform analysis of the information to monitor the status of the co-location data center, detect faults within the system, and predict future faults within the system based on an analysis of historical state data. Further, application platform monitor 132 may provide this information to app log aggregation module 218, which may generate a real time dashboard for presenting this information to a user.

The architecture of real time computation engine 221 illustrated in FIG. 4 is shown for exemplary purposes only. The techniques as set forth in this disclosure may be implemented in the example real time computation engine 221 of FIG. 4, as well as other types of computation engines not described specifically herein. Nothing in this disclosure should be construed so as to limit the techniques of this disclosure to the example architecture illustrated by FIG. 1.

Figure 5:
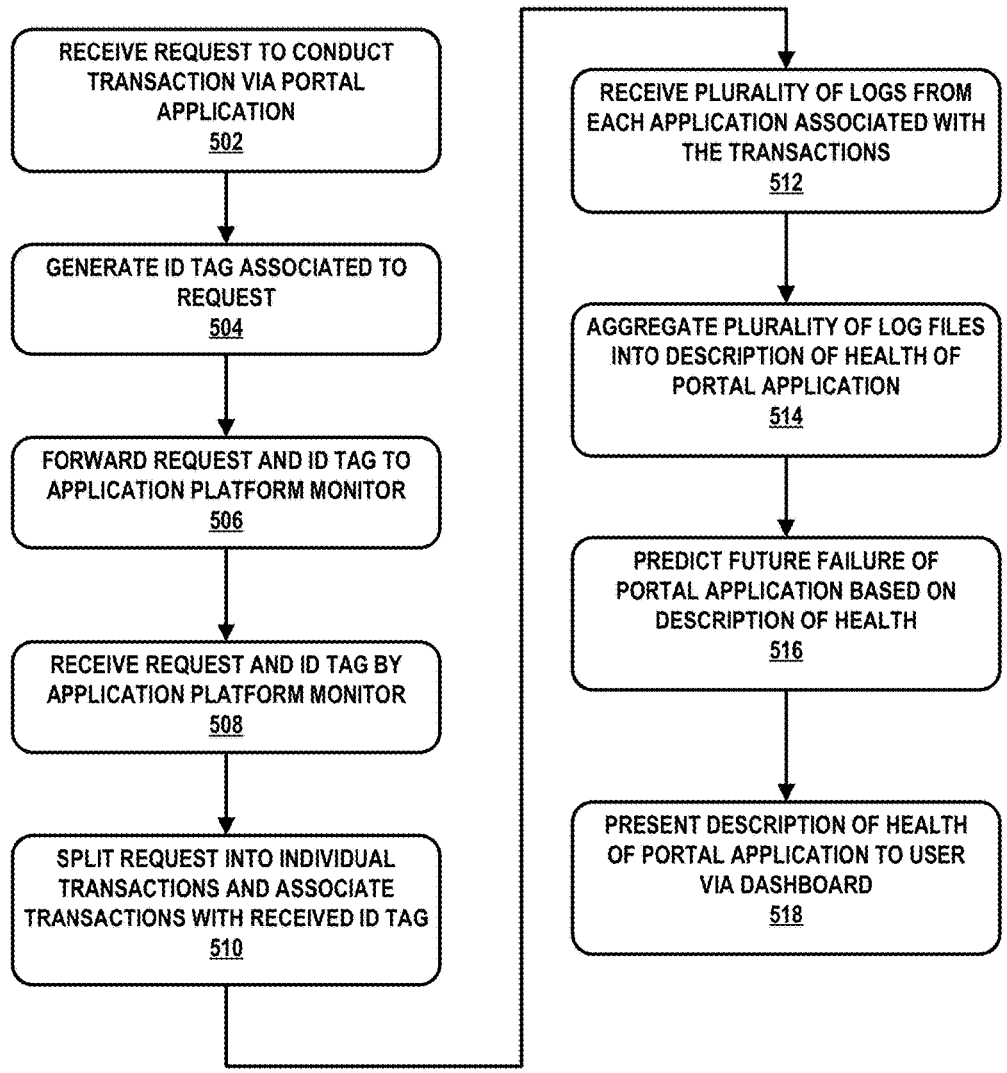
FIG. 5 is a flowchart that illustrates an example method for resource monitoring, fault detection, and fault prediction for a co-location services exchange according to the techniques of the disclosure.

FIG. 5 is a flowchart that illustrates an example method for resource monitoring, fault detection, and fault prediction for a portal application for a co-location data center according to the techniques of the disclosure. For purpose of example, the flowchart of FIG. 5 is described in reference to the example data centers of FIG. 1.

According to the techniques of the disclosure, CDN 136 receives a request from a user to conduct a transaction via a portal application of one of applications 130 for co-location data center 100 (502). In some examples, the user may access a web browser-based portal application provided by CDN 136 as an access point to co-location data center 100. The browser-based portal application, or a proxy server serving the portal application, generates an identification tag associated with the request (504). In some examples, the identification tag is a UNIX date- and timestamp indicating the time that the user submits the request to CDN 136. It is anticipated that generally, a timestamp with approximately millisecond precision is sufficiently precise to ensure that each user request receives a unique identifier. CDN 136 forwards the user request and the identification tag to application platform monitor 132 of co-location data center platform 128 (506).

Application platform monitor 132 of co-location data center platform 128 receives the request and the unique identifier from CDN 136 (508). Application platform monitor 132 determines which applications of applications 130 are required to satisfy the request. Sessionizer 232 may split the request for services into individual transactions with each of the required applications of applications 130, and associates the individual transactions with the received identifier (510). Application platform monitor 132 forwards the individual transactions in association with the received identifier to applications 130 for handling of the user request.

Each of applications 130 generates information including log files, events, and notifications during the course of servicing the user request, and inserts into the log files the received identifier in association with log generated for satisfying the user request. Real time computation engine 221 receives these log files via message broker 220 (512) and aggregates these log files into information describing the health of the applications 130 such as a portal application (514). Real time computation engine 221 stores this compiled information within database 402.

In some examples, real time computation engine 221 performs machine learning on the compiled information to predict a future failure of a portal application of applications 130 (516). For example, real time computation engine 221 analyzes historical information describing the health of a portal application of applications 130, including information describing the health of a portal application of applications 130 prior to a failure of the portal application. For example, real time computation engine 221 examines resource usage, such as the CPU, memory, or network bandwidth consumed by a particular process prior to prior to a failure of co-location data center 100. Through machine learning, real time computation engine 221 may correlate various system information to indicia of pending system faults, such as resource bottlenecks, software or hardware faults, or frozen processes. Real time computation engine 221 may compare this historical indicia of pending system faults to the current health of the portal application. If the current health of the portal application exhibits historical indicia of pending system faults, then real time computation engine 221 predicts that the portal application may suffer a similar fault in the future.

Data platform 134 performs various data warehousing services to organize and search information describing the health of the portal application stored within database 402. Application platform monitor 132 uses data platform 134 to pull real time information describing the health of a portal application for co-location data center 100. Application log aggregation module 218 receives this information and creates a dashboard to display the health information in real time to the user (518). For example, application log aggregation module 218 displays information describing the current health of the portal application, such as network bandwidth consumption, CPU and memory usage, and active processing threads, or other information, on a website where users may view it. Because this information includes the session identifier, this information may be further broken down into specific tasks and processes executing to support co-location data center 100 and the specific users, services, and transactions associated with the information.

Accordingly, a provider of a co-location data center as described herein may monitor resource consumption, detect faults, and predict future faults in real time, and provide this consolidated information to a user. Therefore, a co-location data center platform 128 as described herein operates to inform the provider as to specific processes, resources, software, and hardware that support co-location data center 100 that require attention or maintenance. Such a co-location data center platform 128 may reduce the amount of time required to determine the point of origin of faults within the portal application or supporting applications thereof, as well as allow administrators to perform preventative maintenance to avoid potential failures of the portal application or supporting applications thereof.

Figure 6:
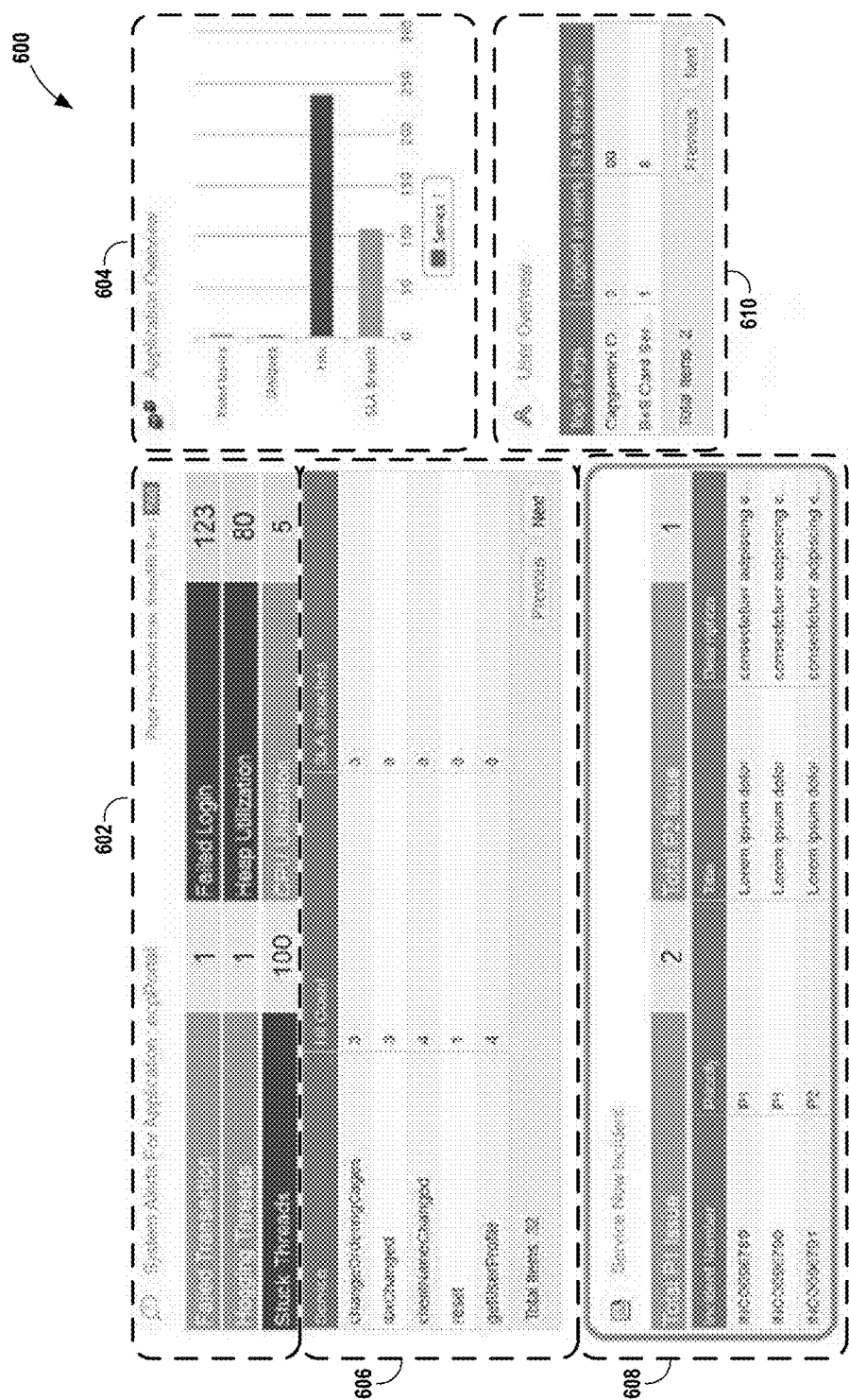
FIG. 6 is an illustration depicting an example dashboard for displaying information regarding resource monitoring, fault detection, and fault prediction for a co-location services exchange according to the techniques of the disclosure.

FIG. 6 is an illustration depicting an example dashboard 600 for displaying information regarding resource monitoring, fault detection, and fault prediction for a co-location services exchange according to the techniques of the disclosure. Application platform monitor 134 may output dashboard 600 for display by a web browser of a user. In some examples, dashboard 600 provides a graphical display of the status information aggregated by application log aggregation module 218. For example, dashboard 600 includes a status indicator 602 for displaying the current status of a portal application. In the example of FIG. 6, status indicator 602 displays a number of failed transactions, hanging threads, stuck threads, failed login attempts, heap utilization, and CPU utilization, as determined according by application platform monitor 134 using techniques described in this disclosure. In some examples, dashboard 600 includes a subservice overview 606 that provides information related to a plurality of subservices associated with the application. In this example, the portal application provides subservices for ordering customer cages, changing a data center, changing a customer ("client") name, resetting a transaction, and obtaining a user profile for the user of the portal. In this example, the subservice overview displays each subservice associated with the application, the number of query hits associated with each subservice, and the number of Service-Level Agreement ("SLA") breaches associated with each subservice. In some examples, dashboard 600 includes an incident overview 608 that displays information regarding incidents and events, such as software or hardware faults, associated with the application. In the example of FIG. 6, incident overview 608 includes information describing the total number of incidents, an incident identifier, the severity or priority of the incident, a title associated with the incident, and a description of the incident.

In some examples, dashboard 600 includes a graph 604 for providing visual means for illustrating information related to the application service. In the example of FIG. 6, graph 604 illustrates, in real time, the number of total users accessing the application, the number of unique users, the number of search query hits on a database associated with the application, and the number of SLA breaches that have occurred. In some examples, dashboard 604 includes an organizational overview 610 that provides a graphical indication of the organizations accessing the application. In the example of FIG. 6, user overview 610 depicts the top five organizations accessing the application, the number of users associated with the organization that are accessing the application, and the number of SLA breaches associated with each organization.

Accordingly, a provider of a co-location data center as described herein may monitor resource consumption, detect faults, and predict future faults in real time, and provide this consolidated information to a user. Therefore, a co-location data center platform 128 as described herein operates to inform a the provider as to specific processes, resources, software, and hardware that support co-location data center 100 that require attention or maintenance. Such a co-location data center platform 128 may reduce the amount of time required to determine the point of origin of faults within the portal application or supporting applications thereof, as well as allow administrators to perform preventative maintenance to avoid potential failures of the portal application or supporting applications thereof.

Figure 7:
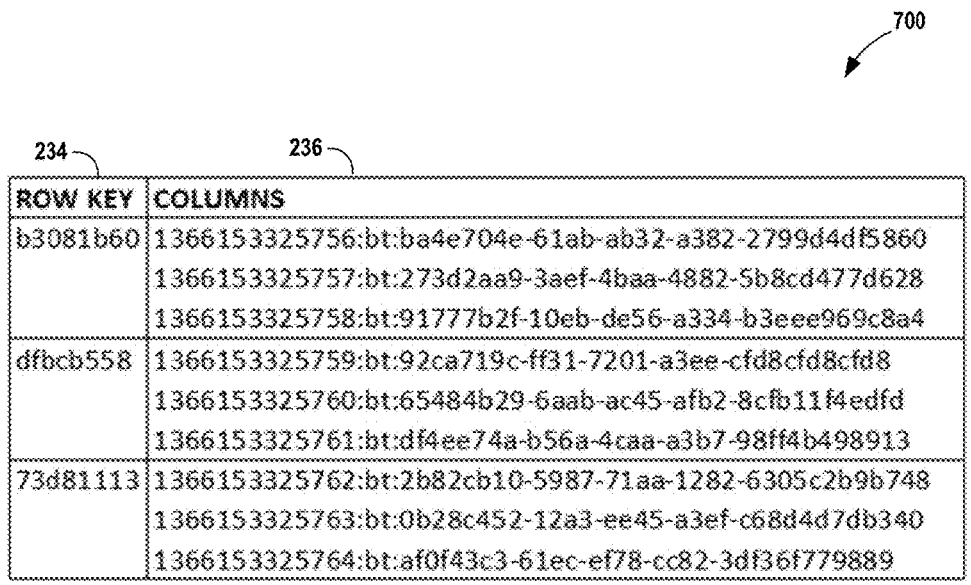
FIG. 7 is an illustration depicting an example table of session identifiers for correlating a user session with sub-services of the co-location services exchange according to the techniques of the disclosure.

FIG. 7 is an illustration depicting an example session table 700 of session identifiers 702 for correlating a user session with subservices of a portal application according to the techniques of the disclosure. With reference to FIGS. 2 and 4, sessionizer 232 may store a plurality of data records and log files 236 associated with a user session serviced by the portal application as a series of column keys in a table of database 402. In some examples, application log aggregation module 218 receives a request to view data records and log files 236 associated with a particular session key via dashboard application 600. Application log aggregation module 218 retrieves the plurality of data records and log files 236 associated with the particular user session by using a session identifier as a row key to index the plurality of data records and log files 236 stored as column keys within database 402. Application log aggregation module 218 aggregates this information and organizes it for display on dashboard 600 for review by the administrator.

According to techniques describe herein, the application logs and proxy logs have been modified for the portal application (or other application in support of co-location data centers 100) to incorporate a CDN request identifier. Behavior tracking messages may be generated to incorporate the CDN request identifier in some instances. The CDN topology, application logs topology, and proxy logs topology for generating corresponding logs facilitate "sessionizing" the data to parse and format the field for each record that will be used to stich the data across the systems. The column 236 family is used to store the data.

In general, to process a log message, the application platform monitor 132 parses the log structure to extract the CDN request identifier from the message text. Application platform monitor 132 then creates or modifies a record in the CDN request identifier is then sent to the appropriate sessionizer 232, which updates the session table 700 in the data store (e.g., database 402) with the record that keys the CDN request identifier in row key column 234 to an identifier for the log message in columns 236, where the identifier for the log message may be usable to retrieve the log message.

For each record, the session id is used as the row key and the column name or value is used to store the value of the corresponding log record. In the example of FIG. 7, the sessionized field for the CDN, the application logs, and the behavior tracking logs are each b3081b60 for the first row. Thus, each record in the above example has a session identifier of b3081b60. This session identifier is a key for both storing the data records and provide the correlation for stitching together log-based data records for a single transaction. The session identifier is used as the row key. In this example, each of the three data records has a column entry which consists of a timestamp:type:eventid tuple. Based on the session identifier, all three records can be retrieved from the various logs using the column entry values.

Accordingly, a co-location data center as described herein may monitor resource consumption, detect faults, and predict future faults with a co-location data center in real time, and provide this consolidated information to a customer. Therefore, a co-location data center as described herein operates to inform a customer as to specific processes, resources, software, and hardware of a portal application for co-location data center 100 that require attention or maintenance. Such a co-location data center may greatly reduce the amount of time required to determine the point of origin of faults within the co-location data center, as well as allow administrators to perform preventative maintenance to avoid potential failures of the co-location data center.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
receiving, by an application platform monitor for a portal application for a co-location data center and from the portal application, an indication of a request for a user to conduct a transaction via a plurality of services that support the portal application and an identification tag associated with the request;
associating, by respective sessionizers of the application platform monitor for the plurality of services, the identification tag with each of a plurality of log file records generated as a result of executing respective sub-transactions by the plurality of services for the transaction;
aggregating, by the application platform monitor, the plurality of log file records into a description of the health of the portal application, wherein each log file record of the plurality of log file records corresponds to one or more events occurring to each service of the plurality of services while processing the transaction; and
outputting, by the application platform monitor for display to the customer, the description of the health of the portal application.

2. The method of claim 1, further comprising predicting, by the application platform monitor and based on the description of the health of the portal application, a failure within the portal application before the failure occurs.

3. The method of claim 2, wherein predicting, based on the description of the health of the portal application, the failure within the portal application before the failure occurs comprises:
based on at least one log file record of the plurality of log file records, determining a description of the portal application over a period of time;
based on the description of the health of the portal application over the period of time, correlating at least one past failure of the portal application with the health of the portal application prior to the at least one past failure;
determining that a current state of the portal application is similar to the health of the portal application prior to the at least one past failure; and upon determining that the current state of the portal application is similar to the health of the portal application prior to the at least one past failure, predicting a failure of the portal application before the failure occurs.

4. The method of claim 3, further comprising sending, by the application platform monitor to another user, an indication of the predicted failure.

5. The method of claim 1, wherein the plurality of log file records comprises:
user behavior tracking information;
website analytics information; and
content delivery network (CDN) status information.

6. The method of claim 1, wherein aggregating the plurality of log file records comprises:
determining the identification tag associated with the request;
identifying, based on the identification tag from a session table that maps identification tags to corresponding log records, the plurality of log file records in separate, respective log files generated by the plurality of services for the transaction; and
reading the plurality of log file records to obtain data describing the one or more events occurring to the plurality of services while processing the transaction.

7. A computing device comprising:
one or more programmable processors operably coupled to at least one memory;
an application platform monitor for a portal application for a co-location data center, the application platform monitor configured for execution by the one or more programmable processors to receive, from the portal application, an indication of a request for a user to conduct a transaction via a plurality of services that support the portal application and an identification tag associated with the request,
wherein the application platform monitor is further configured to associate, by respective sessionizers of the application platform monitor for the plurality of services, the identification tag with a plurality of log files generated as a result of executing respective sub-transactions by the plurality of services for the transaction,
wherein the application platform monitor is further configured to aggregate the plurality of log files into a description of the health of the portal application, wherein each log file of the plurality of log files corresponds to one or more events occurring to each service of the plurality of services while processing the transaction, and
wherein the application platform monitor is further configured to output, for display to the customer, the description of the health of the portal application.

8. The computing device of claim 7, wherein the application platform monitor is further configured to predict, based on the description of the health of the portal application, a failure within the portal application before the failure occurs.

9. The computing device of claim 8, wherein to predict, based on the description of the health of the portal application, a failure within the portal application before the failure occurs the application platform monitor is further configured to:
based on at least one log file record of the plurality of log file records, determine a description of the portal application over a period of time;
based on the description of the health of the portal application over the period of time, correlate at least one past failure of the portal application with the health of the portal application prior to the at least one past failure;
determine that a current state of the portal application is similar to the health of the portal application prior to the at least one past failure; and
upon determining that the current state of the portal application is similar to the health of the portal application prior to the at least one past failure, predict a failure of the portal application before the failure occurs.

10. The computing device of claim 9, wherein the application platform monitor is further configured to send, to another user, an indication of the predicted failure.

11. The computing device of claim 7, wherein the plurality of log file records comprises:
user behavior tracking information;
website analytics information; and
content delivery network (CDN) status information.

12. The computing device of claim 7, wherein the application platform monitor configured to aggregate the plurality of log files is further configured to:
determine the identification tag associated with the request;
identify, based on the identification tag from a session table that maps identification tags to corresponding log records, the plurality of log file records in separate, respective log files generated by the plurality of services for the transaction; and
read the plurality of log file records to obtain data describing the one or more events occurring to the plurality of services while processing the transaction.

13. A non-transitory computer-readable medium comprising instructions to cause at least one processor of a computing device to:
receive, by an application platform monitor from a portal application for a co-location data center, an indication of a request for a user to conduct a transaction via a plurality of services that support the portal application and an identification tag associated with the request;
associate, via respective sessionizers of the application platform monitor for the plurality of services, the identification tag with each of a plurality of log file records generated as a result of executing respective sub-transactions by the plurality of services for the transaction;
aggregate the plurality of log file records into a description of the health of the portal application, wherein each log file record of the plurality of log file records corresponds to one or more events occurring to each service of the plurality of services while processing the transaction; and
output, for display to the customer, the description of the health of the portal application.

14. The computer-readable medium of claim 13, wherein the instructions cause the at least one processor to predict, based on the description of the health of the portal application, a failure within the portal application before the failure occurs.

15. The computer-readable medium of claim 14, wherein the instructions cause the at least one processor to predict, based on the description of the health of the portal application, the failure within the portal application before the failure occurs are further configured to cause the at least one processor to:

predict, based on the description of the health of the portal application, the failure within the portal application before the failure occurs comprises:
  based on at least one log file record of the plurality of log file records, determine a description of the portal application over a period of time;
  based on the description of the health of the portal application over the period of time, correlate at least one past failure of the portal application with the health of the portal application prior to the at least one past failure;
  determine that a current state of the portal application is similar to the health of the portal application prior to the at least one past failure; and
  upon determining that the current state of the portal application is similar to the health of the portal application prior to the at least one past failure, predict a failure of the portal application before the failure occurs.

16. The computer-readable medium of claim 15, wherein the instructions cause the at least one processor to send, to another user, an indication of the predicted failure.

17. The computer-readable medium of claim 13, wherein the plurality of log file records comprises:
  user behavior tracking information;
  website analytics information; and
  content delivery network (CDN) status information.

18. The computer-readable medium of claim 13, wherein to aggregate the plurality of log file records the instructions to cause the at least one processor to:
  determine the identification tag associated with the request;
  identify, based on the identification tag from a session table that maps identification tags to corresponding log records, the plurality of log file records in separate, respective log files generated by the plurality of services for the transaction; and
  read the plurality of log file records to obtain data describing the one or more events occurring to the plurality of services while processing the transaction.

* * * * *